Patented Apr. 9, 1929.

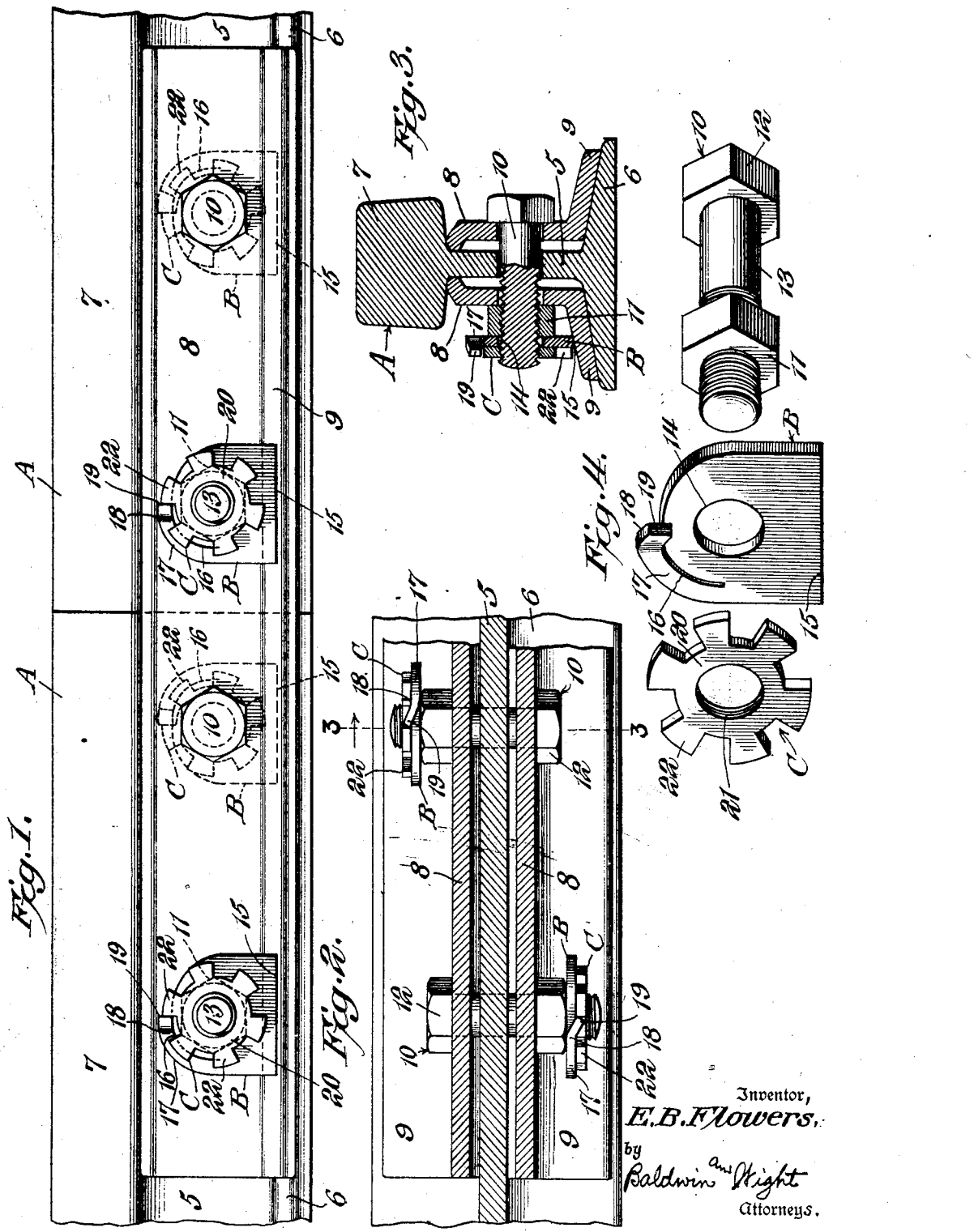

1,708,305

UNITED STATES PATENT OFFICE.

EDWARD B. FLOWERS, OF AKRON, OHIO.

NUT LOCK.

Application filed March 31, 1928. Serial No. 266,346.

This invention relates to new and useful improvements in nut locks generally, although the invention is particularly adapted for use in connection with rail joints.

One of the principal objects of my invention is to provide an attachment for use with a bolt and nut of ordinary construction whereby said nut may be readily locked against accidental reverse turning.

Another object lies in the provision of a washer and locking nut which may be readily connected to the ordinary bolt and nut after said bolt and nut have been secured in place and without modifying the construction of either the bolt or nut.

With these and other objects in view which will more fully appear, the nature of the invention will be more clearly understood by following the description, the appended claims, and the several views illustrated in the accompanying drawings.

In the accompanying drawings which show one form of my invention:

Fig. 1 is a front elevation of a rail joint embodying my invention,

Fig. 2 is a horizontal sectional view thereof,

Fig. 3 is a cross sectional view taken on the line 3—3 of Fig. 2, and

Fig. 4 is a view showing in perspective the separate parts of my invention.

Like reference numerals designate corresponding parts throughout the several figures of the drawings.

Referring to the drawings, I have shown my invention as being applied to and forming part of a rail joint which includes the usual rails A—A, each embodying a web 5, base flange 6 and head 7. A pair of fish plates 8—8 are disposed on opposite sides of the webs 5 of the rails and extend across the meeting or abutting ends of the rails. Each fish plate includes an outwardly extending foot or base flange 9 which rests upon the base flange 6 of the rail. A plurality of bolts 10 and associated nuts 11 of ordinary construction serve to connect the webs 5 and fish plates 8. Each bolt includes a head 12 and a threaded shank 13, the head bearing against the outer face of one fish plate. The nuts 11 are threaded onto the shanks 13 and bear against the outer face of the opposite fish-plate. As thus far described the parts are of usual construction, and the jarring of the rails incident to railway rolling stock passing thereover very quickly causes the nuts to turn and thereby loosen the joint.

My invention is in the nature of an attachment to or a part of the combination with the above construction and functions to positively secure or lock the clamping nut against accidental turning without the necessity of employing especially constructed bolts and nuts, or changing or in any manner modifying the ordinary bolts and nuts now in general use.

To this end, I employ a washer B and a locking nut C.

The washer B which is in the nature of a thin metallic plate, preferably of spring metal, is formed with a central opening 14 having a diameter slightly greater than the diameter of the shank 13 of the bolt 10. The washer body is provided with a flat edge 15, and this body adjacent the margin thereof but at a point spaced from the flat edge 15, is cut or slotted as at 16 to form a resultant spring locking tongue 17, the free end portion 18 thereof projecting outwardly beyond one face of the washer body, the extreme end 19 of the tongue being disposed in a plane perpendicular to the base or flat edge 15 which plane passes through the axis of the opening 14.

The locking nut C is also formed of a thin metallic plate forming a body portion or annulus 20 having a concentric and threaded opening 21. Extending radially from the threaded annulus is a plurality of locking fingers 22.

In practice, the washer B is positioned in advance of a given nut 11 with the threaded end of the bolt shank 13 projecting through the opening 14, with the flat edge 15 resting on the foot 9 of the adjacent fish plate 8, and with the free end portion 18 of the locking tongue 17 extending forwardly towards the free end of the bolt shank. Thus the washer which is loosely mounted on the bolt in advance of the nut 11, is retained against rotation relative to the bolt by engagement between the flat edge 15 of the washer and the foot 9 of the fish plate 8. It will also be noted that the washer B bears against the front or outer face of the nut 11 but does not have any interlocking connection therewith. It will be understood that in some cases the fish plates may be devoid of the feet 9 and consequently in rail joints of this type, the flat edge 15 will directly engage the base flange of the rail.

The locking nut C is then threaded onto the outer end of the bolt shank 13 in advance of the washer B and this nut is turned as far as possible, thus clamping the washer B against the nut 11, the locking fingers 22 of the nut passing the spring tongue 18 of the washer until the nut is tightened as much as possible at which time the extreme end 19 of said tongue will be positioned intermediate a pair of locking fingers 22 of the washer B and thereby retain the locking nut C against accidental turning in the reverse direction. Thus the nut 11 is held against outward longitudinal movement on the bolt and consequently said nut is retained against reverse rotation.

It is of course to be understood that the details of structure and arrangements of parts may be variously changed and modified without departing from the spirit and scope of my invention.

I claim:

1. The combination of a threaded bolt and nut thereon, and a nut-locking attachment comprising a washer loosely mounted on the bolt in engagement with the outer face of the nut and in engagement with one of the parts secured by the bolt and lock whereby said washer will be retained against rotation relative to the bolt, said washer having a spring tongue extending away from said outer face of the nut, and a locking nut threaded on the bolt in front of the outer face of the washer and provided peripherally with alternate radially extending fingers and spaces adapted for successive interlocking engagement with the spring tongue of the washer.

2. The combination of a threaded bolt and nut thereon, and a nut-locking attachment comprising a washer mounted on the bolt in engagement with the outer face of the nut and engageable with one of the parts secured by the bolt whereby said washer will be retained against rotation relative to the latter, said washer having a spring tongue, a relatively thin locking nut threaded on the bolt in engagement with the outer face of the washer and provided peripherally with cut-out portions extending completely through the same, said cut-out portions being adapted for locking engagement by the said spring tongue.

In testimony whereof, I have hereunto subscribed my name.

EDWARD B. FLOWERS.